United States Patent [19]

Bajard

[11] Patent Number: 4,484,696

[45] Date of Patent: Nov. 27, 1984

[54] APPARATUS FOR AUTOMATIC BURETTING

[76] Inventor: Jean Bajard, "Le Vallon" 5, rue Charles Baudelaire, Griesheim-sur-Souffel (Bas-Rhin), France

[21] Appl. No.: 422,476

[22] Filed: Sep. 23, 1982

[30] Foreign Application Priority Data

Sep. 23, 1981 [FR] France ................................ 81 18065

[51] Int. Cl.$^3$ ........................ G01F 11/42; B67D 5/30

[52] U.S. Cl. ........................................ 222/64; 222/20; 222/56; 222/205

[58] Field of Search ........... 73/864.01, 864.11, 864.12, 73/864.13, 864.14, 864.15, 864.16, 864.18; 422/100; 222/20, 56, 63, 64, 205

[56] References Cited

U.S. PATENT DOCUMENTS 1,705,940 3/1929 Moisant ................................ 222/205

3,143,393 8/1964 De Seguin des Hons ....... 73/863.32

3,193,141 7/1965 Badgley .

3,206,072 9/1965 Mencken .

3,491,368 1/1970 Debbrecht .

4,336,000 6/1982 Jorgensen et al. ............... 73/864.16

FOREIGN PATENT DOCUMENTS 2330499 1/1975 Fed. Rep. of Germany .......... 73/14

1237774 6/1960 France .

2000695 9/1969 France .

2005374 12/1969 France .

*Primary Examiner*—S. Clement Swisher

*Attorney, Agent, or Firm*—Young & Thompson

[57] ABSTRACT

Apparatus for automatic buretting comprises an automatic buretting actuator (1) and a burette unit (2) in the form of two separable subassemblies. The burette unit (2) is removably mounted in the actuator (1) even when filled, while remaining closed in a sealed fashion and is constituted by a burette (3) connected at its lower end to a valve (4) with three passages and three positions, provided with an actuator (5). The automatic buretting actuator (1) is constituted by a stepping motor (9) provided with a connection (10) for operating the valve (4) of the burette unit (2). An electronic control assembly (13) has a control and display panel (14). A lever (15) provides quick release of the burette unit (2).

9 Claims, 5 Drawing Figures

APPARATUS FOR AUTOMATIC BURETTING

The present invention relates to the manipulation of quantitites of liquids for operations such as taking specimens or the distribution of reagents or for performing dilutions, and has for its object an automatic buretting apparatus intended for this purpose.

At present, in manually performed laboratory operations consisting in manipulating or determining volumes of liquid in a precisely reproducible manner, there are generally used pipettes or graduated burettes, measurement being effected by the relative position of a meniscus and graduation marks. These known means are simple, reliable and inexpensive.

There are also automatic buretting devices such as dilutors, distributors or titrators, which are most often of the syringe type permitting an easier mechanization than the pipettes, the movement of the piston of the syringe in particular being power driven.

However, these known devices have the drawback of being less precise and reliable than pipettes, it being possible to suffer loss at the piston joint and there being as a result the possibility of the latter gripping.

Finally, it is also known to use a pipette, particularly of the bulb type, to which are connected photoelectric detectors signalling the arrival of the meniscus at an upper position and at a lower position, a valve with three passages and two positions, and a system of conduits and a reservoir permitting the gravity circulation of the liquid, alternately to fill the pipette from the reservoir, in one position of the valve, then to empty the pipette into another receptacle, in the other position of the valve, the filling and emptying of the pipette being verified by the position of the meniscus as found by detectors.

After the preliminary adjustment of such a distributor, it is possible to distribute a given quantity of a liquid in a perfectly reproducible manner. However, because of this preliminary adjustment, great flexibility of use is not possible, particularly as concerns changing the volumes of the liquid to be handled.

The present invention has for its object to overcome these drawbacks.

Thus, it has for its object the provision of an automatic buretting apparatus characterized in that it is constituted by an automatic buretting actuator and by a burette unit comprising two separable subassemblies. The burette unit is removably mounted in the actuator, even when filled, while remaining closed in a sealed manner, and is constituted by a burette connected at its lower end to a valve with three passages and three positions, provided with an actuator. The valve is connected with tubes, of which one empties into a product reservoir, the burette being provided at its upper end with a sealed pneumatic connection serving also for positioning the burette. The automatic buretting actuator is constituted by a stepping motor provided with a coupling for driving the valve of the burette unit, by a photoelectric detection assembly of the meniscus comprising a movable detector driven in translation, by a pneumatic suction and pressure device connected to the burette, by an electronic control assembly having a control and display panel, and by a quick-acting lever for the burette unit.

The invention will be better understood from a consideration of the following description, which relates to a preferred embodiment, given by way of non-limiting example, and explained with reference to the accompanying schematic drawings, in which.

Figure 1:
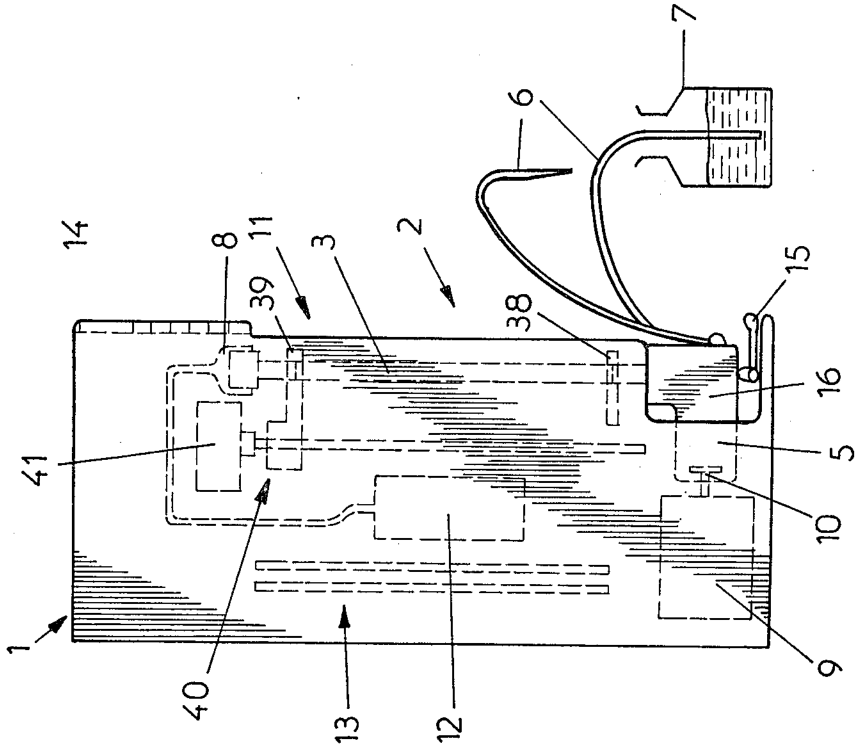
FIG. 1 is a side elevational view of apparatus according to the invention.
Figure 2:
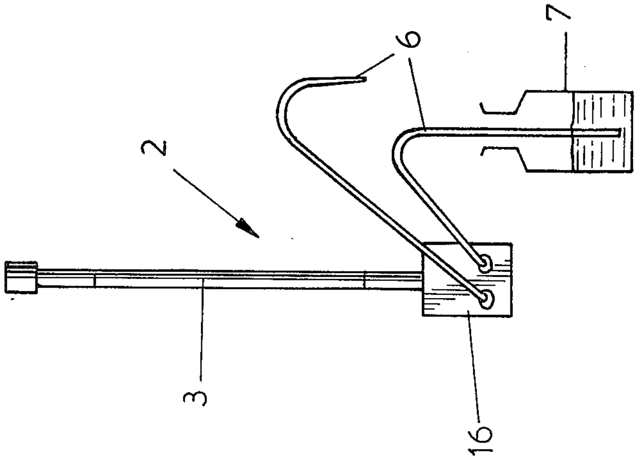
FIG. 2 is a front elevational view of the burette unit.

According to the invention, and as is more particularly shown by way of example in FIG. 1 of the accompanying drawings, the automatic buretting apparatus is essentially constituted by an automatic buretting actuator 1 and by a burette unit 2, which comprise two separable subassemblies. The burette unit 2 is removably mounted in actuator 1 and is comprised by a burette 3 connected at its lower end to a valve 4 with three passages and three positions, provided with an actuator 5, and which is connected to tubes 6 of which one empties into a product reservoir 7. At its upper end, burette 3 is provided with a device 8 for sealed pneumatic connection, which serves also for its positioning.

The automatic burette actuator 1 is constituted by a stepping motor 9 provided with a disengageable coupling 10 for actuating valve 4 of burette unit 2, by a photoelectric detection assembly 11 for the position of the meniscus, by a pneumatic suction and pressure device 12 connected to burette 3, by an electronic control assembly 13 having a control and display panel 14, and by a quick-acting lever 15 for burette unit 2.

Figure 3:
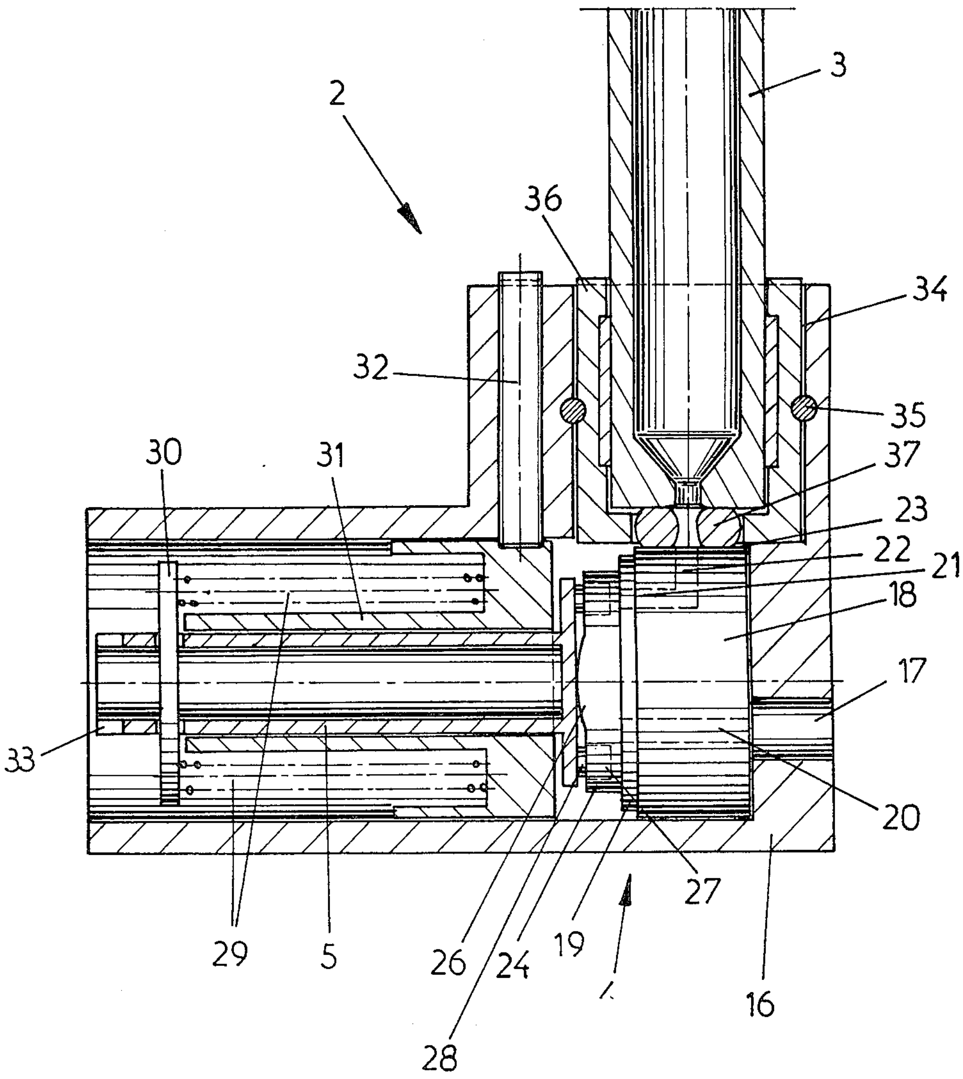
FIG. 3 is a cross-sectional view, on an enlarged scale, of the burette unit.
Figure 4:
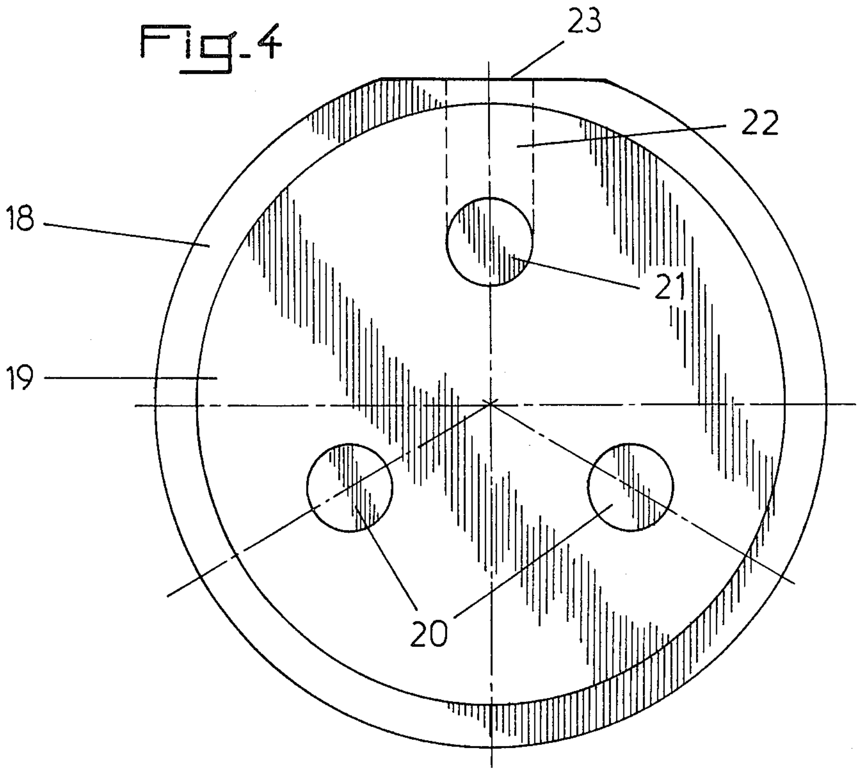
FIG. 4 is a plan view, on an enlarged scale, of the base of the valve.
Figure 5:
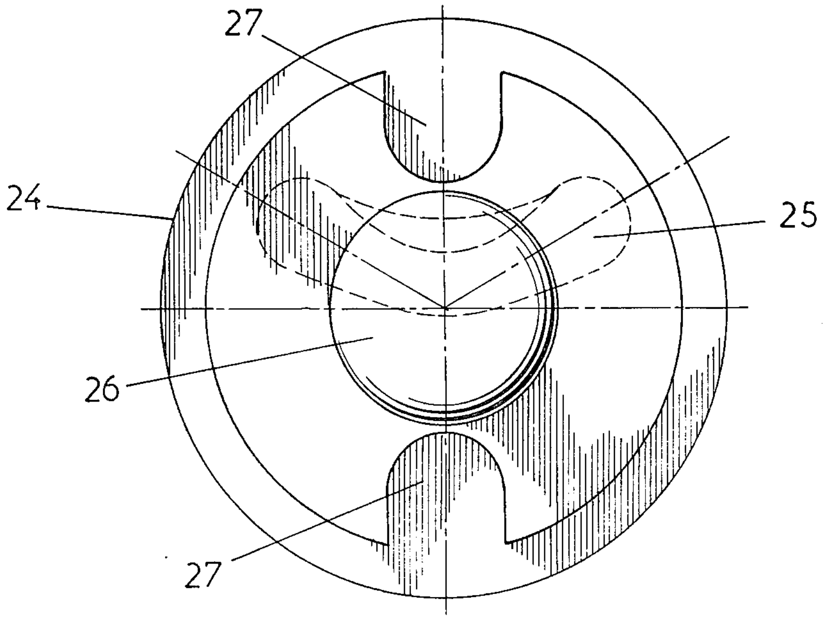
FIG. 5 is a view similar to that of FIG. 4 of the rotatable valve member.

Valve 4 is disposed in valve body 16 that serves to center burette 3 and that has openings 17 for the connection of tubes 6 (FIG. 3), and is constituted by a base 18 (FIG. 4) having the form of a disc and comprising, on one surface about its center, a raised portion 19 which is completely flat and polished comprising a first sealing member, and into which empty perpendicularly three passageways 20, 21 of which two, 20, empty on the opposite side of the disc, and of which the third, 21, is connected to a channel 22 which opens perpendicularly through a flat 23 formed on the periphery of disc 18 for the connection of burette 3, and by a rotatable valve member 24 forming the second sealing member and comprising also a surface which is completely flat and polished, in which is provided a recess 25 of curved configuration (FIG. 5).

The channels 20, 21 are preferably disposed at 120° from each other, and the recess 25 has a central angle, between its ends, of 120°. Thus, after application of the valve member 24 to the base 18, the ends of the recess 25 may be precisely superposed with the openings of channel 21 and one of the channels 20 in one of the positions of rotation, or with the openings of channel 21 and the other channel 20 in the other position of rotation, no connection being established in a middle position of the valve member 24 and the channels 20, 21 being closed in sealed condition in this intermediate position.

On the opposite face to that having recess 25, valve member 24 is provided with a central contact surface 26 and two or more openings 27 spaced at regular intervals about its periphery, these openings cooperating with drive pins 28 fixed to a member forming the coupling means 5 in such a way as to effect a peripheral drive, this member 5 having single point bearing at its center on the surface 26, one or the other of these two members in contact being to this end convex, and being urged by traction springs 29 by means of a transverse pin 30 or the like, this member 5 being moreover guided in a mounting sleeve 31 in body 16, in which it is immobilized by means of a set screw 32, or by analogous urging means, the spring assembly 29 and transverse pin 30 comprising a device for automatically returning valve 4 to its median position.

At its end opposite rotatable valve member 24, drive member 5 is provided with a transverse slot 33 for driving connection with the coupling 10 of motor 9.

Thanks to this construction of valve 4, there is attained complete sealing between its constructional elements, and its rapid rotation may be effectuated without reversal, the pressing force being applied to the center of the valve member 24 without requiring very precise orientation of the drive member 5. Moreover, the provision of at least two recesses 27 for driving, or a higher number of these recesses arranged at regular intervals, helps avoid a reversing couple, these recesses 27 and the corresponding pins 28 serving also to maintain coaxial relationship between valve member 24 and base 18.

Base 18 and valve member 24 are preferably constructed in a material resistant to corrosion by chemical agents, and they are so proportioned that the widths of the joints provide the necessary internal and external sealing in all positions.

Perpendicular to the drive member 5, the valve body 16 is provided with a bore 34 permitting the positioning of the burette 3 by means of keys 35 cooperating with a circular throat of a metallic cylindrical sleeve 36 fixed to the lower end of burette 3 coaxially with the latter and bearing on the flat 23 of base 18 of valve 4 through a compressed joint 37, this sleeve being of constant external diameter no matter what the external diameter of the burette and the caliber of the latter. Thanks to this arrangement, burette 3 is secured to valve body 16 without residual play, and the positioning of the valve 16 will automatically position the burette 3.

The sealed pneumatic connecting means 8 at the upper end of burette 3 is in the form of a sleeve like that for the lower end of burette 3, this sleeve cooperating, on the one hand, with a guide bore (not shown) located in actuator 1 and, on the other hand, with a compressible sealing joint connected to the pneumatic device 12 for suction and pressure. This device 12 permits moving the handled liquids by suction or by positive pressure, thereby to distribute the liquids. Because the upper and lower sleeves always have the same diameter, and the burettes all have the same length, no matter what burette is used and no matter what its caliber, in all valve bodies to comprise a burette unit of constant gage, all the burette units 2 thus constituted may be completely interchangeably mounted in the actuator 1.

The burettes 3 which are used are comprised by standardized calibrated tubes, which is to say they are of constant cross section throughout their length, provided with two graduations spaced apart a distance corresponding to the nominal volume of burette. The interior diameters of these tubes may vary slightly, the distances separating the marks may thus also vary, whereupon the actuator 1 should be provided with means taking account of this possible variation.

To this end, the photoelectric detection assembly 11 for the position of the meniscus is disposed in the actuator 1 parallel to the burette 3 and is constituted by a fixed lower detector 38 at whose level are disposed the lower graduation marks of all the burettes 3, and by a movable upper detector 39 displaceable by means of a screw nut assembly 40 or the like, by a stepping motor 41 which is controlled by the electronic control assembly 13 as a function of data on the calibration of the burette unit 2 in question, provided on the control and display panel 14. These data are preferably introduced into a memory of assembly 13 during a preliminary calibration operation conducted by an operator, and in the course of which a given burette unit 2 will be given a certain identification number, which can be used each time the burette unit is used, whereby the predetermined adjustment will take place automatically as soon as the identification number is entered.

According to a characteristic of the invention, for using the device as a burette, the lower detector 38 is maintained in abutment at the level of the lower graduation marks of the burettes 3 by means of a resilient spring device or the like, and may be disabled under the action of an overrun of the upper movable detector 39 when the latter is displaced downwardly to the level of the lower graduation marks of the burettes 3, whereby all the useful or nominal volume of the burettes 3 may be used as a burette.

According to a characteristic of the invention, the electronic control assembly 13 is provided with calculating means, permitting determination for the burette unit 2 in question of intermediate volumes as needed.

Quick-acting lever 15 of burette unit 2 is preferably an eccentric lever, or elastically biassed, thereby providing at the same time the sealed application of the upper end of the burette 3 against the guide bore of the actuator 1, the connection between the drive member 5 of the valve 4 and the coupling 10 of the stepping motor 9, and the locking in position of the burette unit 2 in the actuator 1 with simultaneous alignment of the burette 3 with the axes of the detectors 38 and 39, a release lever 15 acting to free instantaneously the burette unit 2 for its subsequent replacement by another unit.

According to a modification of the invention, not shown in the accompanying drawings, the burette unit 2 may be disposed, together with other burette units, on an intermittent or continuous transport device, circular or linear, of known type, its positioning and maintenance in actuator 1, as well as its withdrawal being effectuated automatically by said transport device by means of a jack or the like.

Thanks to the invention, it is possible to distribute in a repetitive and extremely precise manner volumes of different liquids without risking pollution of the distribution circuits and without requiring rinsing the circuits, the burette unit 2 being easily and rapidly interchangeable, and the program for the new burette unit which is inserted being determined thanks to its characteristic number.

Of course, the invention is not limited to the embodiment described and shown in the accompanying drawings. Modifications are possible, particularly with respect to the construction of the various elements, or by substitution of equivalent means, without thus departing from the scope of protection of the invention.

What is claimed is:

1. Automatic buretting apparatus, characterized in that it comprises an automatic buretting actuator (1) and a burette unit (2) in the form of two separable subassemblies, in that the burette unit (2) is removably mounted in the actuator (1), even when filled, while remaining sealed and closed, and is constituted by a burette (3) connected at its lower end to a valve (4) with three passages and three positions, provided with drive means (5), and which is connected to tubes (6), of which one empties into a product reservoir (7), the burette (3) being provided at its upper end with sealed pneumatic connecting means (8) which also position the burette (3), and in that the automatic buretting actuator (1) is comprised by a stepping motor (9) provided with a coupling (10) for actuating the valve (4) of the burette unit (2), by a photoelectric detection assembly (11) for the meniscus comprising a movable detector (39) driven in translation, by a pneumatic suction and pressure device (12) connected to the burette (3), by an electronic control assembly (13) provided with a control and display panel (14), and by a quick-acting lever (15) for freeing the burette unit (2) for replacement by another buretting unit.

2. Apparatus according to claim 1, characterized in that the valve (4) is disposed in a valve body (16) which centers the burette (3) and has openings (17) for connection to said tubes (6), and is constituted by a base (18) having the form of a disc and comprising on one surface about its center, a raised portion (19) whose surface is flat and polished forming a first seal, and into which empty perpendicularly three channels (20, 21) of which two (20) open through the opposite face of the disc, and of which the third (21) is connected to a perpendicular channel (22) opening through a flat (23) on the periphery of the disc (18) for the connection of the burette (3), by a rotatable valve member (24) forming the second sealing member and having also a flat polished face, in which is provided a recess 25 of arcuate shape, on the opposite face from that bearing the recess (25), the valve member (24) being provided with a central contact surface (26) and at least two recesses (27) spaced at regular intervals about its periphery, these recesses cooperating with drive pins (28) fixed to a coupling member (5) so as to provide peripheral drive, this member (5) having point contact at its center on the surface (26), one or another of the two members in contact being convex for this purpose, and being pressed together by traction springs (29) through a transverse pin (30), this member (5) being moreover guided in a sleeve (31) for mounting in the body (16), where it is fixed by means of a set screw (32), the assembly of springs (27) and transverse pin (30) forming automatic return means to the middle position of the valve (4).

3. Apparatus according to claim 2, characterized in that at its end opposite the rotatable valve member (24), the coupling member (5) is provided with a transverse slot (33), disposed on the vertical axis of the burette and permitting its driving connection with the coupling (10) of the motor (9).

4. Apparatus according to claim 2, characterized in that perpendicular to the drive member (5), the valve body (16) is provided with a bore (34) permitting positioning of the burette (3) by means of keys (35) coacting with a circular throat of a cylindrical metal sleeve (36) secured to the lower end of the burette (3) coaxially with the latter and bearing on the flat (23) of the base (18) of the valve (4) via a compressed joint (37), said sleeve being of constant external diameter no matter what the external diameter of the burette (3) and the caliber of the burette (3).

5. Apparatus according to claim 1, characterized in that the sealed pneumatic coupling device (18) on the upper end of the burette (3) is in the form of a sleeve which coacts, on the one hand, with a guide bore in the actuator (1) and, on the other hand, with a compressible sealing joint connected to the pneumatic suction and pressure device (12), said sleeve having a constant external diameter.

6. Apparatus according to claim 1, characterized in that the photoelectric detection assembly (11) for the position of the meniscus is disposed in the actuator (1) parallel to the burette (3) and is constituted by a fixed lower detector (38) at whose level are disposed the lower graduation marks of all the burettes (3), and by a movable upper detector (39) displaceable by a screw-nut assembly (40), by a stepping motor (41) which is controlled by the electronic control assembly (13) as a function of data relative to the calibration of the burette unit (2) in question, given on the control and display panel (14) characterized in that upon changing the burette unit the entry of the corresponding identification number will effect automatic regulation of the actuator (1), in order to allow the determination of any volume as needed which is compatible with the nominal volume of the burette (3).

7. Apparatus according to claim 6, characterized in that for use of the apparatus as a burette, the lower detector (38) is maintained in abutment at the level of the lower graduation marks of the burettes (3) by elastic spring means, and may be deactuated under the action of a pressure from the movable upper detector (39) when the latter is displaced downwardly to attain said level of the lower graduation marks of the burettes (3), whereby all the useful and nominal volume of the burette (3) may be utilized as a burette.

8. Apparatus according to claim 1, characterized in that the quick-acting lever (15) for the burette unit (2) is an eccentric lever permitting simultaneously the sealed application of the upper end of the burette (3) against the guide bore of the actuator (1), the engagement between the drive member (5) of the valve (4) and the coupling (10) of the stepping motor (9), and the locking in position of the burette unit (2) in the actuator (1) with simultaneous alignment of the burette (3) with the axis of upper and lower meniscus level detectors (38) and (39), the release of the lever (15) acting instantaneously to free the burette unit (2) for its subsequent replacement by another unit.

9. Apparatus according to claim 1, characterized in that the burette unit (2) is disposed in assembly with other burette units on a transport means which is actuated to bring the various burette units selectively into operative position in the actuator (1).

* * * * *